(12) United States Patent
Zheng

(10) Patent No.: US 9,038,205 B2
(45) Date of Patent: May 26, 2015

(54) FLUSH TOILET

(71) Applicant: Guangmin Zheng, Liaocheng (CN)

(72) Inventor: Guangmin Zheng, Liaocheng (CN)

( * ) Notice: Subject to any disclaimer, the term of this patent is extended or adjusted under 35 U.S.C. 154(b) by 65 days.

(21) Appl. No.: 14/027,302

(22) Filed: Sep. 16, 2013

(65) Prior Publication Data

US 2014/0007337 A1     Jan. 9, 2014

Related U.S. Application Data

(63) Continuation-in-part of application No. PCT/CN2012/072470, filed on Mar. 16, 2012.

(51) Int. Cl.
*E03D 9/10*       (2006.01)
*E03D 5/016*      (2006.01)
*A47K 11/02*      (2006.01)
*E03D 5/014*      (2006.01)

(52) U.S. Cl.
CPC .............. *E03D 5/016* (2013.01); *A47K 11/02* (2013.01); *E03D 5/014* (2013.01); *E03D 9/10* (2013.01)

(58) Field of Classification Search
USPC .......... 4/317–322, 441, 442, 111.1, DIG. 12; 210/179
See application file for complete search history.

(56) References Cited

U.S. PATENT DOCUMENTS 3,713,177 A * 1/1973 Tufts et al. ........................ 4/320
4,521,304 A * 6/1985 Yount ........................... 4/111.1
7,449,107 B2 * 11/2008 Lumbert ........................ 210/179

* cited by examiner

*Primary Examiner* — Tuan N Nguyen
(74) *Attorney, Agent, or Firm* — Wayne & King LLC

(57) ABSTRACT

A flush toilet including a seat; a stirring device; and a control unit. The stirring device includes a stirring chamber, a mixer, and a drain outlet. The stirring device is disposed below the seat. The stirring chamber communicates with the seat. The drain outlet is disposed at the lower part of the stirring device and communicates with the stirring chamber. A closing device is disposed on the drain outlet to control the opening and closing of the drain outlet. The mixer and a motor for driving the mixer are disposed in the stirring chamber. The control unit controls the operation of the motor.

12 Claims, 4 Drawing Sheets

FLUSH TOILET

CROSS-REFERENCE TO RELATED APPLICATIONS

This application is a continuation-in-part of International Patent Application No. PCT/CN2012/072470 with an international filing date of Mar. 16, 2012, designating the United States, now pending, and further claims priority benefits to Chinese Patent Application No. 201110063230.9 filed Mar. 16, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a water-saving flush toilet.

2. Description of the Related Art

Conventional flush toilets employ tap water or water mist to flush by means of negative pressure, which consumes a large amount of water, and the cleaning effect is not satisfactory.

SUMMARY OF THE INVENTION

In view of the above-described problems, it is one objective of the invention to provide a water-saving flush toilet.

To achieve the above objectives, in accordance with one embodiment of the invention, provided is a water-saving flush toilet, comprising a seat; a stirring device comprising a stirring chamber, a mixer, and a drain outlet; and a control unit. The stirring device is disposed below the seat. The stirring chamber communicates with the seat. The drain outlet is disposed at a lower part of the stirring device and communicates with the stirring chamber. A closing device is disposed on the drain outlet to control the opening and closing of the drain outlet. The mixer and a motor for driving the mixer are disposed in the stirring chamber. The control unit controls the operation of the motor.

In a class of this embodiment, the closing device comprises a pipe having the same diameter as the drain outlet, both ends of the pipe are open, the pipe is connected to a lifting device for lifting the pipe, and the lifting device is controlled by the control unit.

In a class of this embodiment, the lifting device employs an electromagnetic lever structure.

In a class of this embodiment, a movable plate is disposed at an upper part of the stirring chamber, and the movable plate is connected to a pulling device which is controlled by the control unit.

In a class of this embodiment, the movable plate comprises a reset spring.

In a class of this embodiment, the mixer comprises at least one rotor wheel, and each rotor wheel is connected to one motor.

In a class of this embodiment, the control unit employs a programmable control unit.

In a class of this embodiment, the flush toilet further comprises a rotary channel structure comprising a channel pipe and a drive gear which is controlled by the control unit, and an upper part of the channel pipe is connected to a lower part of the seat.

In a class of this embodiment, an openable lower end plate controlled by the control unit is disposed at a lower part of the channel pipe, and an openable upper end plate controlled by the control unit is disposed at an upper part of the channel pipe.

In a class of this embodiment, a filtration and collection device for urine is disposed at one side of the stirring device, and the filtration and collection device for urine is connected to a flush device via pipelines to flush the flush toilet.

In a class of this embodiment, the flush toilet further comprises a drying device.

In a class of this embodiment, the flush toilet further comprises a movable cover.

Advantages of the invention are summarized below: the flush toilet is capable of achieving cleanness without consuming tap water, so it is environmental friendly, and is easy for manufacturing.

DETAILED DESCRIPTION OF THE EMBODIMENTS

The invention is further described hereinbelow combined with the drawings.

Figure 1:
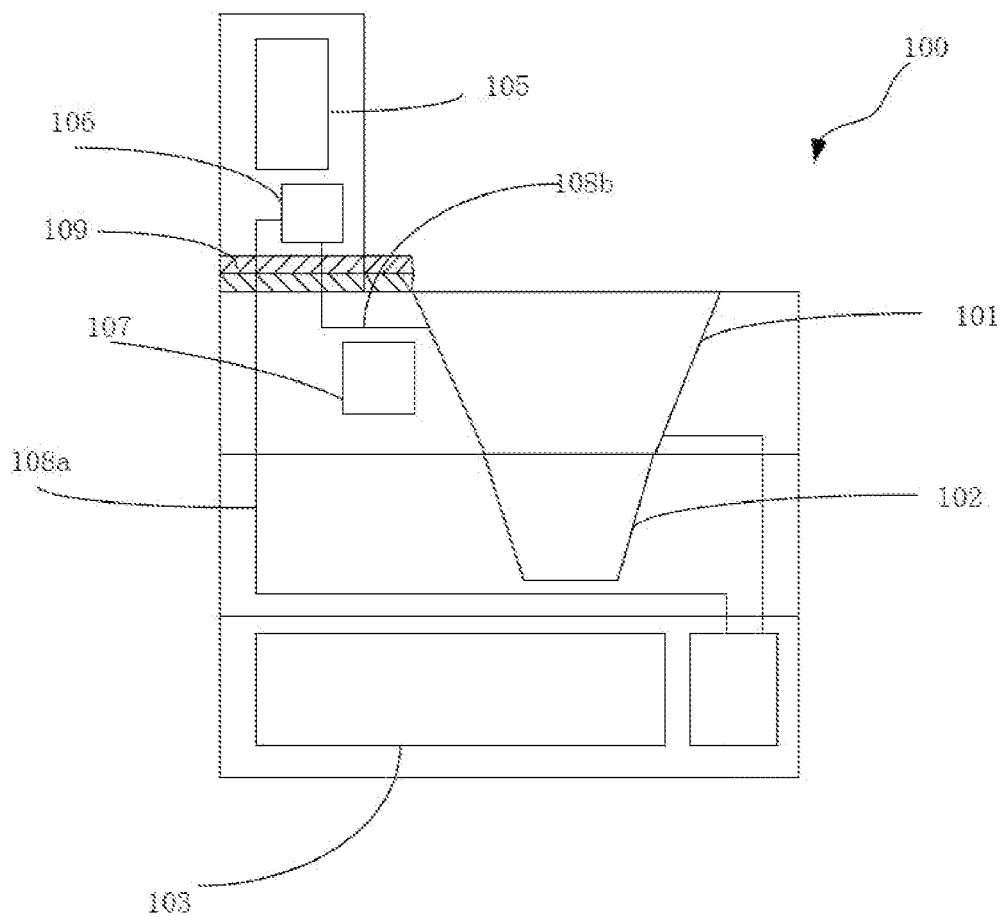
FIG. 1 is a structural diagram of a flush toilet in accordance with one embodiment of the invention.

As shown in FIG. 1, a flush toilet 100 comprises a seat 101, a rotary channel structure 102, a stirring device 103, a control device 105, a flush device 106, and pipelines 108a and 108b. The rotary channel structure 102 and the stirring device 103 are disposed below the seat 101. The stirring device comprises a stirring chamber. The stirring chamber communicates with the seat 101 via the rotary channel structure 102. The control unit 105 controls the operation of the rotary channel structure 102 and the stirring device 103.

A filtration and collection device 312 for urine is disposed at one side of the stirring device. The filtration and collection device for urine directly collects the liquid from the seat 101 via pipelines, for example, urine. The liquid is first filtered to be clean and free of odor, transported via the pipeline 108a and a pump to the flush device 106 disposed at the upper part of the flush toilet, and then flushes the flush toilet via the pipeline 108b. The collected urine is purified and recycled for the flush, so the flush toilet can work free of water.

The flush toilet further comprises a drying device 107. After flushed by the flush device 106, the flush violet is dried immediately by the drying device 107 under the control of the control unit 105, whereby buffering the odors.

As shown in FIG. 1, the flush toilet further comprises a movable cover 109. Prior to flushing the toilet, under the control of the control unit 105, the movable cover 109 stretches to cover and seal the seat 101. Thus, a sealed space is formed in the toilet for the flushing and stirring thereby preventing the diffusion of the odors. The movable toilet 109 can be a double layered structure, upon stretching, the two layers overlap to expand the covering area for covering the whole opening of the seat. Optionally, the movable toilet may employ other structures for sealing, for example, an individually-controlled control button.

Figure 2:
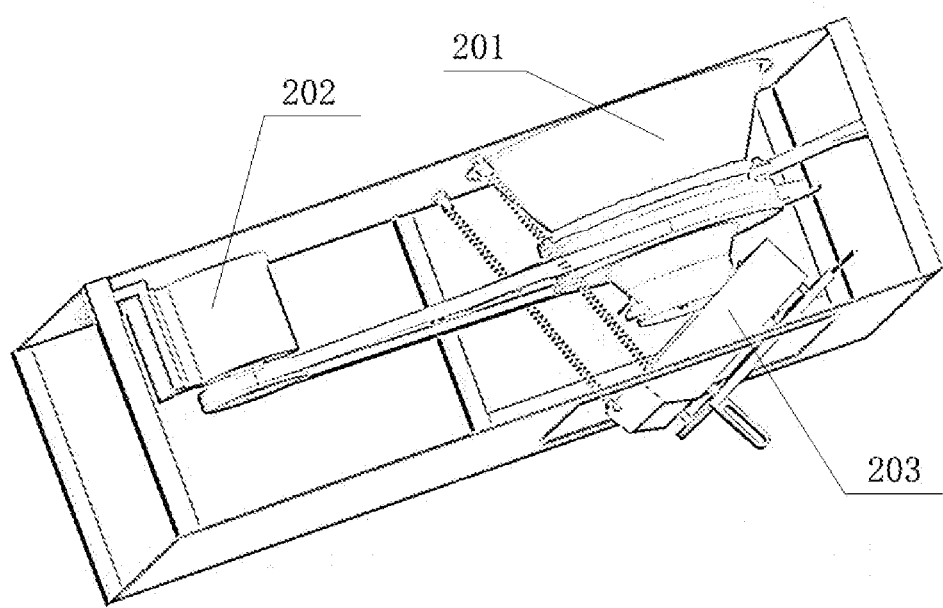
FIG. 2 is a structural diagram of a rotary channel structure of a flush toilet in accordance with one embodiment of the invention.

As shown in FIG. 2, the rotary channel structure comprises a channel pipe 201 and a drive gear which is controlled by the control unit. The drive gear comprises a rotary motor 202 and a transmission belt. An upper part of the channel pipe 201 is connected to a lower part of the seat. An openable lower end plate 203 controlled by the control unit is disposed at a lower part of the channel pipe 201, and an openable upper end plate (not shown in the figure) controlled by the control unit is disposed at an upper part of the channel pipe 201.

Figure 3:
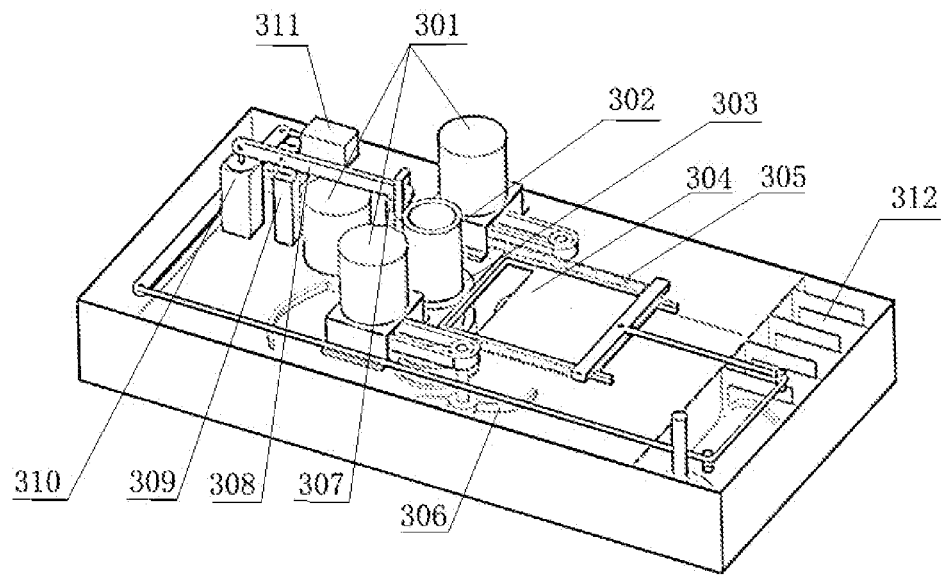
FIG. 3 is a stereogram of a stirring device of a flush toilet in accordance with one embodiment of the invention.
Figure 4:
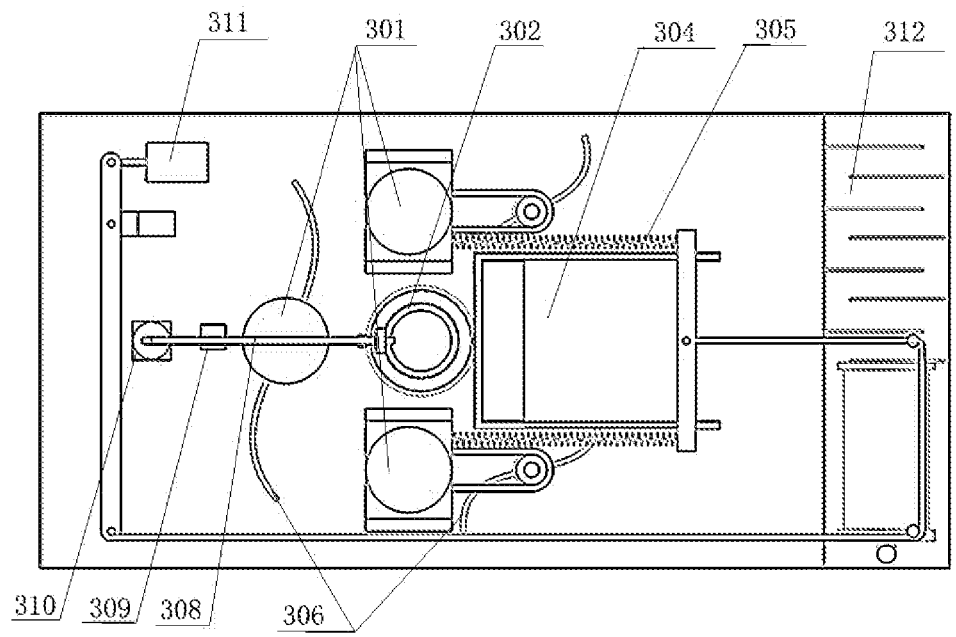
FIG. 4 is a top view of a stirring device of FIG. 3.

As shown in FIGS. 3 and 4, the drain outlet 303 is disposed at a lower part of the stirring device 103 and communicates with the stirring chamber. A closing device is disposed on the drain outlet to control the opening and closing of the drain outlet. The closing device comprises a pipe 302 having the same diameter as the drain outlet 303; both ends of the pipe are open. The pipe is connected to a lifting device for lifting the pipe, and the lifting device is controlled by the control unit 105. The lifting device employs an electromagnetic lever structure comprising a tension spring 307, a connecting rod 308, a bearing 309, and a first electromagnet 310. The bearing 309 is disposed below the connecting rod 308 for supporting the lever action of the connecting rod 308. The tension spring 307 is disposed at one end of the connecting rod 308 where the pipe 302 is connected, for controlling the combination of the pipe 302 and the drain outlet 303. The first electromagnet 310 is disposed at another end of the connecting rod 308 and is controlled by the control unit 105. When the pipe 302 falls down to seal the drain outlet 303 under the action of the tension spring 307, both ends of the pipe 302 are open. When the pipe 302 lifts under the action of the first electromagnet 310, the mixed liquid in the stirring chamber is drained from the drain outlet 303.

A mixer is disposed in the stirring chamber. Specifically, the mixer is a rotor wheel 306 comprising three fans. The stirring chamber further comprises three motors 301 providing power for the three fanned rotor wheels. Each of the rotor wheels is connected to one of the three motors. The mixer may be a rotor wheel optionally comprising one fan, two fans, four fans, or something like that. Accordingly, the number of the motors requires to be corresponding.

A movable plate 304 is disposed at an upper part of the stirring chamber. The movable plate 304 is connected to a pulling device which is controlled by the control unit. The pulling device is electromagnetic and comprises a second electromagnet 311 and a reset spring 305.

The control unit 305 employs a programmable control unit, for example, a single chip microcomputer. The control unit 305 controls the operation of the rotary channel structure 102 and the stirring device 103. Specifically, the openable upper end plate of the channel pipe 201 opens under the control of the control unit 105 (a sensor is optionally used to open the upper end plate), after the urination, the openable upper end plate of the channel pipe 201 closes under the control of the control unit 105 (a sensor is also optionally used to close the upper end plate). Thereafter, the rotary motor 202 drives the channel pipe 201 to rotate. The openable lower end plate 203 of the channel pipe 201 opens under the control of the control unit 105, excrement in the channel pipe 201 falls into a vessel on the movable plate 304, and then the openable lower end plate 203 closes. The movable plate 304 opens under the action of the second electromagnet 311, excrement falls into the stirring chamber, the movable plate 304 resets under the reset spring 305. The rotor wheel 306 is driven by the motor 301 to stir the excrement to be slurry. Then the rotor wheel stops. The pipe 302 lifts under the action of the electromagnetic lever structure, and the slurry is drained from the drain outlet 303. The pipe 302 falls down to seal the drain outlet 303 under the action of the tension spring 307.

Optionally, the slurry is not necessary to be drained out each time. A volume sensor is disposed in a vessel accommodating the slurry, when a preset volume is satisfied, the slurry is drained out. For example, the slurry can be drained out once each week.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A flush toilet, comprising:
   a) a seat;
   b) a stirring device, the stirring device comprising a stirring chamber, a mixer, and a drain outlet; and
   c) a control unit;
wherein
   the stirring device is disposed below the seat;
   the stirring chamber communicates with the seat;
   the drain outlet is disposed at a lower part of the stirring device and communicates with the stirring chamber;
   a closing device is disposed on the drain outlet to control the opening and closing of the drain outlet;
   the mixer and a motor for driving the mixer are disposed in the stirring chamber; and
   the control unit controls the operation of the motor.

2. The flush toilet of claim 1, wherein the closing device comprises a pipe having the same diameter as the drain outlet, both ends of the pipe are open, the pipe is connected to a lifting device capable of lifting the pipe, and the lifting device is controlled by the control unit.

3. The flush toilet of claim 2, wherein the lifting device employs an electromagnetic lever structure.

4. The flush toilet of claim 1, wherein a movable plate is disposed at an upper part of the stirring chamber, and the movable plate is connected to a pulling device which is controlled by the control unit.

5. The flush toilet of claim 4, wherein the movable plate comprises a reset spring.

6. The flush toilet of claim 1, wherein the mixer comprises at least one rotor wheel, and each rotor wheel is connected to one motor.

7. The flush toilet of claim 1, wherein the control unit employs a programmable control unit.

8. The flush toilet of claim 1, further comprising a rotary channel structure comprising a channel pipe and a drive gear which is controlled by the control unit, and an upper part of the channel pipe is connected to a lower part of the seat.

9. The flush toilet of claim 8, wherein an openable lower end plate controlled by the control unit is disposed at a lower part of the channel pipe, and an openable upper end plate controlled by the control unit is disposed at an upper part of the channel pipe.

10. The flush toilet of claim 1, wherein a filtration and collection device for urine is disposed at one side of the stirring device, and the filtration and collection device for urine is connected to a flush device via pipelines to flush the flush toilet.

11. The flush toilet of claim 1, further comprising a drying device.

12. The flush toilet of claim 1, further comprising a movable cover.

\* \* \* \* \*